C. W. GRESSLE.
TRANSVERSELY SPLIT DEMOUNTABLE RIM.
APPLICATION FILED JUNE 17, 1916.
1,312,535. Patented Aug. 12, 1919.
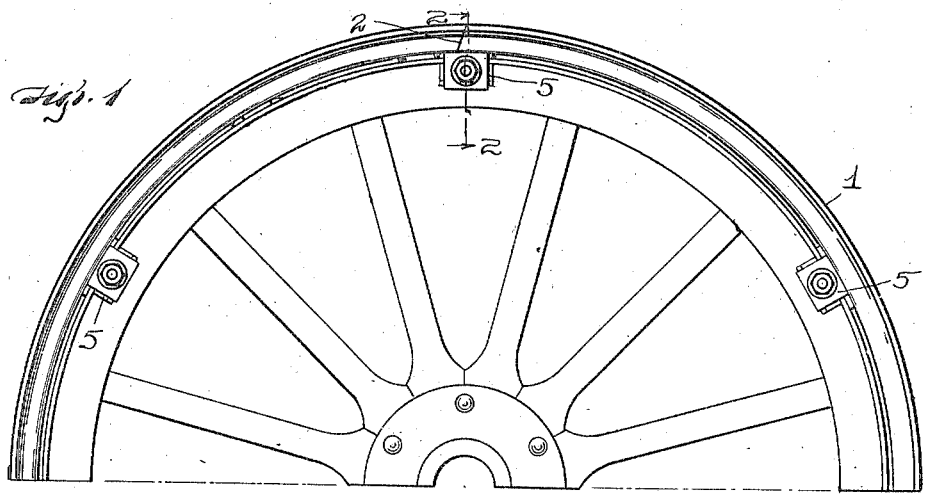
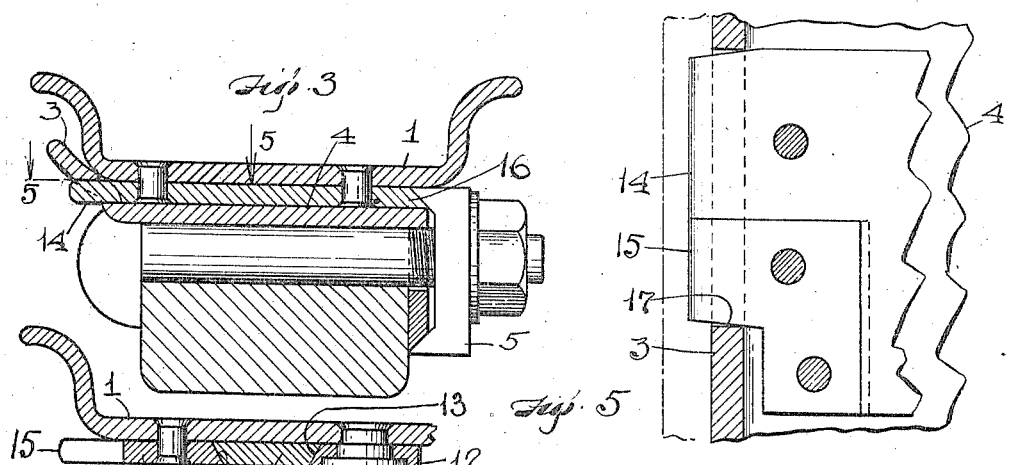
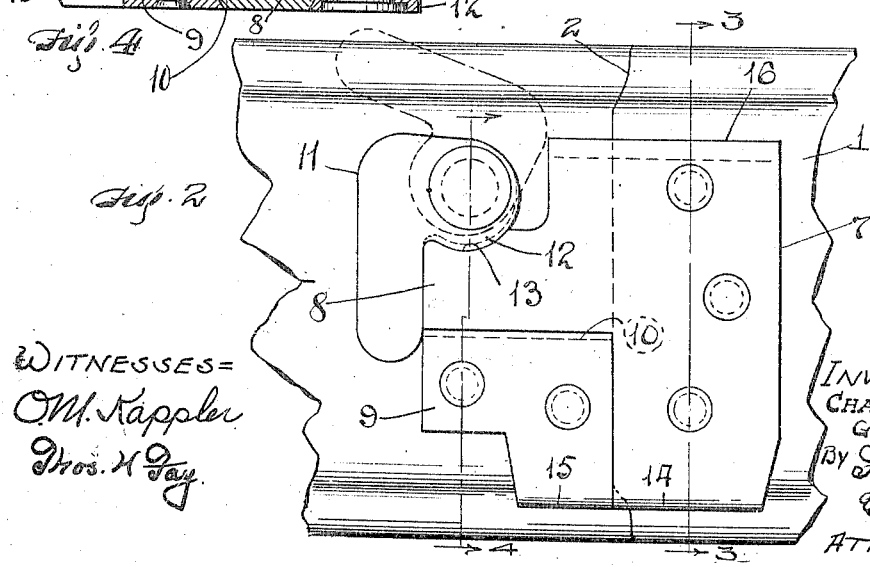
WITNESSES:
O. M. Kappler
Thos. H. Fay
INVENTOR
CHARLES W. GRESSLE.
By Fay, Oberlin
and Fay
ATTORNEYS.

UNITED STATES PATENT OFFICE.

CHARLES W. GRESSLE, OF CLEVELAND, OHIO, ASSIGNOR, BY MESNE ASSIGNMENTS, TO THE STANDARD PARTS COMPANY, OF CLEVELAND, OHIO, A CORPORATION OF OHIO.

TRANSVERSELY-SPLIT DEMOUNTABLE RIM.

1,312,535.  Specification of Letters Patent.  Patented Aug. 12, 1919.

Application filed June 17, 1916. Serial No. 104,143.

*To all whom it may concern:*

Be it known that I, CHARLES W. GRESSLE, a citizen of the United States, and a resident of Cleveland, county of Cuyahoga, and State of Ohio, have invented a new and useful Improvement in Transversely-Split Demountable Rims, of which the following is a specification, the principle of the invention being herein explained and the best mode in which I have contemplated applying that principle, so as to distinguish it from other inventions.

The present improvements relate, as indicated, to the so-called transversely split type of demountable rim such as is extensively used on automobiles at the present time, the object of the invention being to provide a more satisfactory type of device for securing together the ends of such a rim, that is a device that will consist of a minimum number of parts, and not only be easy to operate but also convenient and inexpensive to manufacture. To the accomplishment of the foregoing and related objects, the invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:—

Figure 1 is an elevation of a half of a wheel and a rim of the type in question provided with my improved device; Fig. 2 is a bottom plan view of the rim-ends showing such improved locking device; Fig. 3 is a transverse section of such wheel and rim taken on the plane indicated by the line 3—3, Fig. 1; Fig. 4 is a transverse section of a detail taken on the plane indicated by the line 4—4, Fig. 2; and Fig. 5 is a longitudinal section of another detail taken on the plane indicated by the line 5—5, Fig. 3.

The form of demountable rim 1 illustrated is a modification of the so-called Continental type of rim, being transversely split at one point 2 in its circumference, so as to permit the rim to be collapsed in order to remove a damaged tire therefrom or place a fresh tire thereon, as need not be further explained. Aside from being thus trans-split, such rim is further modified to adapt it to be demountably secured onto the wheel body in a different manner from that ordinarily used with rims of the general type in question. In other words, while the rear edge of the rim is adapted to seat on an inclined flange 3 bent radially outward from the corresponding edge of the felly-band 4, instead of introducing a plurality of wedges in circumferentially spaced relation between the front edge of the rim and wheel body, thereby placing the rim under tension by reason of the outward component of the force exerted by the several wedges, I utilize a series of clamps 5, the action of which is to draw radially inwardly upon the rim.

Neither the clamps just referred to, however, nor the special adaptation of the rim-end locking means for coöperation therewith, to which reference will be presently made, forms a part of the present invention, and so these features need not be described with any particular detail.

The rim-end locking device, proper, includes a plate 7 rigidly attached to the inner face of the rim adjacent the one end thereof, either by being riveted as shown, or welded, or otherwise, as found most convenient in practice. Such plate 7 is provided with an extension in the form of a projecting tongue 8, which projects across the split 2 in the rim, so as to underlie the other end of the latter, where it abuts laterally, with its one side, against a second plate 9 similarly fixedly attached to the inner face of such second rim-end. The abutting side or edge of this second plate is preferably undercut as indicated at 10 in Fig. 4, and the engaging side of the tongue is formed in a complementary fashion so as to be held against displacement in a radial direction when the rim-ends are properly alined.

In order to force and retain the tongue 8 in engagement with such second plate 9, as well as to prevent separation of the plates and thus of the rim-ends longitudinally, that is in a circumferential direction, a movable member is provided on the second rim-end adjacent the opposite side of the tongue, from that which thus engages with such second plate. This member preferably takes the form of a pivotal latch 11 having an eccentric portion 12 that is adapted in one position to interlock with a corresponding recess or notch 13 in the side of the tongue in question, as shown in full lines in Fig. 2, while in another position of the latch, as shown in dotted lines in the figure just named, the tongue is left entirely free, so that the rim ends may be readily separated in the usual manner.

As shown in Fig. 4, the eccentric portion of this latch in undercut in a fashion similar to that of the engaging edge of the second plate, so as to overlie the portion of the tongue wherewith it engages. This feature may or may not be used, as desired, to supplement the action of the plate in preventing radial displacement of the rim-ends.

It will be similarly noted that one of the side clamps 5 on the wheel body, as shown in Figs. 1 and 3, bridges, and engages with the forward edge 16 of the plate 7, so as to pull radially inwardly upon the same, and that similarly the rear edges 14 and 15 of both plates 6 and 7 are extended so as to engage with a slot 17 in the flange 3 on the felly-band 4. These are the features referred to above as not included in the present invention, but appear merely incidentally.

From the description given of the rim-end locking device, it will be readily understood how it is utilized in practice. It should also be clear that it provides not only an unusual degree of security, but also requires very few parts of simple form and easily assembled into the completed structure.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. The combination with a demountable rim of the tranversely split type; of means for securing the ends thereof together, said means including a rigid projection on one such rim-end, the other rim-end being provided with an abutment adapted to engage one side of such projection, so as to prevent lateral displacement thereof in one direction, and a movable member adapted to have an interlocking engagement with the other side of such projection so as to prevent longitudinal displacement as well as lateral displacement thereof in the opposite direction.

2. The combination with a demountable rim of the transversely split type; of means for securing the ends thereof together, said means including a rigid projection on one such rim-end, the other rim-end being provided with an abutment adapted to engage one side of such projection so as to prevent lateral displacement thereof in one direction and a latch pivotally mounted on such last-named rim-end and adapted to have an interlocking engagement with the other side of such projection so as to prevent longitudinal displacement as well as lateral displacement thereof in the opposite direction.

3. The combination with a demountable rim of the transversely split type; of means for securing the ends thereof together, said means including a rigid projection on one such rim-end having one side straight and the other formed with a recess, the other rim-end being provided with an abutment adapted to engage the straight side of such projection so as to prevent lateral displacement thereof in one direction, and a latch pivotally mounted on such last-named rim-end and having an eccentric portion adapted in one position of said latch to interlock with the recess in the other side of such projection, so as to prevent longitudinal displacement as well as lateral displacement thereof in the opposite direction.

4. The combination with a demountable rim of the transversely split type; of means for securing the ends thereof together, said means including a plate rigidly secured on the inner face of said rim having a tongue projecting across the split therein, said tongue having one side straight and the other formed with a recess, another plate on the other rim-end disposed to abut against the straight side of such tongue so as to prevent lateral displacement thereof in one direction, and a latch pivotally mounted on such last-named rim-end and having an eccentric portion adapted in one position of said latch to interlock with the recess in the other side of such tongue, so as to prevent longitudinal displacement as well as lateral displacement thereof in the opposite direction.

5. The combination with a demountable rim of the transversely split type; of means for securing the ends thereof together, said means including a rigid projection on one such rim-end, the other rim-end being provided with a laterally undercut abutment adapted to engage one side of such projection and prevent displacement thereof in one direction as well as in a radial direction, and a movable member on such last-named rim-end adapted to engage the opposite side of such projection.

6. The combination with a demountable rim of the transversely split type; of means for securing the ends thereof together, said means including a rigid projection on one such rim-end, the other rim-end being provided with a laterally undercut abutment adapted to engage one side of such projection and prevent displacement thereof in one lateral direction as well as in a radial direction, and a movable member on such last-named rim-end adapted to have an interlocking engagement with the opposite side of such projection, so as to prevent longitudinal displacement as well as lateral displacement thereof in the opposite direction.

7. The combination with a demountable rim of the transversely split type; of means for securing the ends thereof together, said means including a rigid projection on one such rim-end and two members, one fixed and the other movable, on the opposite rim-end respectively adapted to engage opposite sides of said projection to prevent lateral displacement thereof in either direction, one of said members being formed to interlock with said projection so as to prevent longitudinal displacement thereof, as well.

8. The combination with a demountable rim of the transversely split type; of means for securing the ends thereof together, said means including a rigid projection on one such rim-end and two members, one fixed and the other movable, on the opposite rim-end respectively adapted to engage opposite sides of said projection to prevent lateral displacement thereof in either direction, one of said members being formed to interlock with said projection so as to prevent radial displacement thereof, as well.

9. The combination with a demountable rim of the transversely split type; of means for securing the ends thereof together, said means including a rigid projection on one such rim-end and two members, one fixed and the other movable, on the opposite rim-end respectively adapted to engage opposite sides of said projection to prevent lateral displacement thereof in either direction, one of said members being formed to interlock with said projection so as to prevent radial displacement thereof and the other member being formed to interlock with said projection so as to prevent longitudinal displacement thereof, as well.

10. The combination with a demountable rim of the transversely split type; of means for securing the ends thereof together, said means including a rigid projection on one such rim-end and two members, one fixed and the other movable, on the opposite rim-end respectively adapted to engage opposite sides of said projection to prevent lateral displacement thereof in either direction, said fixed member being formed to interlock with said projection so as to prevent radial displacement thereof and said movable member being formed in one position to interlock with said projection so as to prevent longitudinal displacement thereof, as well.

Signed by me, this 25 day of May, 1916.

CHARLES W. GRESSLE.

Attested by—
VELMA L. WILLIAMS,
MAUDE M. COULTER.